(12) United States Patent
Hua et al.

(10) Patent No.: US 12,137,450 B2
(45) Date of Patent: Nov. 5, 2024

(54) COMMUNICATIONS METHOD AND APPARATUS

(71) Applicant: Huawei Technologies Co., Ltd., Shenzhen (CN)

(72) Inventors: Meng Hua, Shanghai (CN); Yuan Yang, Beijing (CN); Hao Tang, Shanghai (CN); Han Zhou, Shanghai (CN); Changguo Jiang, Beijing (CN); Hao Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/095,542

(22) Filed: Nov. 11, 2020

(65) Prior Publication Data

US 2021/0068134 A1    Mar. 4, 2021

Related U.S. Application Data

(63) Continuation of application No. PCT/CN2019/086478, filed on May 10, 2019.

(30) Foreign Application Priority Data

May 11, 2018  (CN) .......................... 201810451238.4

(51) Int. Cl.
*H04W 72/1273*   (2023.01)
*H04B 7/0452*    (2017.01)
(Continued)

(52) U.S. Cl.
CPC ...... *H04W 72/1273* (2013.01); *H04B 7/0452* (2013.01); *H04B 7/0456* (2013.01); *H04L 5/0048* (2013.01); *H04W 72/0453* (2013.01)

(58) Field of Classification Search
None
See application file for complete search history.

(56) References Cited

U.S. PATENT DOCUMENTS

2010/0189038 A1* 7/2010 Chen ..................... H04L 1/0001
                                                              370/328
2010/0303034 A1* 12/2010 Chen ................. H04L 25/03343
                                                              370/329
(Continued)

FOREIGN PATENT DOCUMENTS

CN       102396198 A        3/2012
CN       102791036 A   *   11/2012
(Continued)

OTHER PUBLICATIONS

Dahlman et al., "5G NR The Next Generation Wireless Access Technology," XP055775576 ISBN:978-0-12-814323-0, retrieved on Feb. 12, 2021, total 400 pages (Aug. 17, 2018).
(Continued)

*Primary Examiner* — Andrew C Oh
(74) *Attorney, Agent, or Firm* — Leydig, Voit & Mayer, Ltd.

(57) ABSTRACT

A communications method and apparatus are provided. The method includes: A first terminal side device determines a frequency domain resource of a scheduled first physical downlink shared channel (PDSCH), where the first PDSCH corresponds to a first demodulation reference signal (DM-RS) on a first antenna port; and when the frequency domain resource includes N consecutive frequency domain units, and there is a second DM-RS on a second antenna port in each of L consecutive frequency domain units in the N frequency domain units, determines that precoding of each second DM-RS is the same. The second DM-RS and the first DM-RS are in a same code division multiplexing (CDM) group, the second DM-RS corresponds to a second PDSCH
(Continued)

scheduled for a second terminal side device, each N and L is an integer greater than 1, and L is less than or equal to N.

20 Claims, 10 Drawing Sheets

(51) Int. Cl.
    *H04B 7/0456*     (2017.01)
    *H04L 5/00*     (2006.01)
    *H04W 72/0453*     (2023.01)

(56) References Cited

U.S. PATENT DOCUMENTS

| | | | | |
|---|---|---|---|---|
| 2012/0114065 | A1* | 5/2012 | Luo | H04L 27/2615 375/295 |
| 2012/0213311 | A1* | 8/2012 | Park | H04L 5/0051 375/295 |
| 2012/0275530 | A1* | 11/2012 | Nazar | H04B 7/0456 375/267 |
| 2012/0287966 | A1* | 11/2012 | Wang | H04L 27/2613 375/E1.002 |
| 2012/0300670 | A1* | 11/2012 | Sun | H04L 5/0023 370/254 |
| 2013/0021991 | A1* | 1/2013 | Ko | H04L 5/0053 370/329 |
| 2013/0039291 | A1* | 2/2013 | Blankenship | H04L 5/0094 370/329 |
| 2013/0039332 | A1* | 2/2013 | Nazar | H04B 7/0452 370/330 |
| 2013/0089065 | A1* | 4/2013 | Koorapaty | H04W 56/002 370/336 |
| 2013/0107746 | A1* | 5/2013 | Wang | H04L 25/03343 370/252 |
| 2013/0336280 | A1* | 12/2013 | Nordstrom | H04W 72/0446 370/330 |
| 2014/0045510 | A1* | 2/2014 | Yue | H04B 7/0632 455/450 |
| 2014/0233474 | A1* | 8/2014 | Wu | H04L 5/0053 370/329 |
| 2014/0269519 | A1* | 9/2014 | Shan | H04L 5/0053 370/329 |
| 2015/0055616 | A1* | 2/2015 | Kim | H04L 27/2605 370/330 |
| 2015/0078271 | A1* | 3/2015 | Kim | H04L 5/005 370/329 |
| 2015/0181570 | A1* | 6/2015 | Sorrentino | H04W 72/12 370/329 |
| 2015/0288435 | A1* | 10/2015 | Nammi | H04L 5/0048 375/267 |
| 2015/0289236 | A1* | 10/2015 | Seo | H04W 72/23 370/335 |
| 2015/0373694 | A1* | 12/2015 | You | H04L 5/0051 370/329 |
| 2016/0013904 | A1* | 1/2016 | Seo | H04L 25/0236 370/329 |
| 2016/0353424 | A1* | 12/2016 | Stirling-Gallacher | H04B 7/0626 |
| 2017/0041906 | A1* | 2/2017 | Tsai | H04W 52/262 |
| 2017/0078126 | A1* | 3/2017 | Einhaus | H04L 1/0009 |
| 2017/0134082 | A1* | 5/2017 | Onggosanusi | H04B 7/0639 |
| 2017/0238312 | A1* | 8/2017 | Chen | H04L 1/1812 370/329 |
| 2017/0366377 | A1* | 12/2017 | Papasakellariou | H04L 5/0053 |
| 2018/0041259 | A1* | 2/2018 | Kim | H04L 25/0204 |
| 2018/0145809 | A1* | 5/2018 | Kwak | H04L 25/0228 |
| 2018/0167252 | A1* | 6/2018 | Wang | H04B 7/0669 |
| 2018/0220433 | A1* | 8/2018 | Li | H04W 72/12 |
| 2018/0254867 | A1 | 9/2018 | Kim et al. | |
| 2018/0262244 | A1* | 9/2018 | Noh | H04B 7/063 |
| 2018/0278395 | A1* | 9/2018 | Yoon | H04L 5/0051 |
| 2018/0279352 | A1* | 9/2018 | Chuang | H04L 5/0051 |
| 2018/0367205 | A1* | 12/2018 | Liu | H04B 7/0486 |
| 2020/0036555 | A1* | 1/2020 | Davydov | H04L 25/0224 |
| 2020/0195317 | A1* | 6/2020 | Yasukawa | H04B 7/0456 |
| 2020/0374084 | A1* | 11/2020 | Yuan | H04L 5/0053 |
| 2020/0396047 | A1* | 12/2020 | Gao | H04L 5/10 |
| 2021/0083735 | A1* | 3/2021 | Sundararajan | H04B 7/0456 |

FOREIGN PATENT DOCUMENTS

| | | | | |
|---|---|---|---|---|
| CN | 103782560 | A | | 5/2014 |
| CN | 104363071 | A | | 2/2015 |
| CN | 104753647 | A * | 7/2015 | .......... H04L 5/0051 |
| CN | 103858498 | B | | 9/2017 |
| CN | 107431682 | A | | 12/2017 |
| CN | 108292941 | A * | 7/2018 | .......... H04B 7/0469 |
| CN | 108809609 | A * | 11/2018 | .......... H04L 27/261 |
| CN | 110036574 | A * | 7/2019 | .......... H04B 7/0404 |
| EP | 3468061 | A1 * | 4/2019 | .......... H04B 7/0452 |
| TW | 201325120 | A * | 6/2013 | .......... H04W 72/121 |
| WO | WO-2011053085 | A2 * | 5/2011 | .......... H04J 13/0048 |
| WO | WO-2011161907 | A1 * | 12/2011 | .......... H04L 1/0007 |
| WO | 2012129798 | A1 | | 10/2012 |
| WO | WO-2013023621 | A1 * | 2/2013 | .......... H04B 7/2612 |
| WO | WO-2013025344 | A1 * | 2/2013 | ............. H04L 5/001 |
| WO | WO-2013110212 | A1 * | 8/2013 | ......... H04L 25/0204 |
| WO | WO-2013137625 | A1 * | 9/2013 | .......... H04L 5/0023 |
| WO | WO-2014141920 | A1 * | 9/2014 | ............. H04J 11/00 |
| WO | WO-2015168940 | A1 * | 11/2015 | ........... H04W 24/02 |
| WO | 2017047971 | A1 | | 3/2017 |
| WO | 2017142643 | A1 | | 8/2017 |
| WO | WO-2018021867 | A1 * | 2/2018 | .............. H04B 7/08 |
| WO | WO-2018028384 | A1 * | 2/2018 | ............. H04B 7/024 |
| WO | WO-2018082395 | A1 * | 5/2018 | ............... H04B 7/04 |
| WO | WO-2018128410 | A1 * | 7/2018 | .......... H04B 7/0408 |

OTHER PUBLICATIONS

"DM-RS Antenna Port Mapping and Control Signalling," 3GPP TSG RAN1 #60bis, R1-102138, Beijing, China, pp. 1-6, 3rd Generation Partnership Project, Valbonne, France (Apr. 12-16, 2010).
"Remaining Issues on DM-RS," 3GPP TSG RAN WG1 Meeting #92, R1-1802401, Athens, Greece, pp. 1-7, 3rd Generation Partnership Project, Valbonne, France (Feb. 26-Mar. 2, 2018).
"3rd Generation Partnership Project; Technical Specification Group Radio Access Network; NR; Physical channels and modulation (Release 15)," 3GPP TS 38.211 V15.1.0, pp. 1-90, 3rd Generation Partnership Project, Valbonne, France (Mar. 2018).
"3rd Generation Partnership Project; Technical Specification Group Radio Access Network; NR; Multiplexing and channel coding (Release 15)," 3GPP TS 38.212 V15.1.1, pp. 1-94, 3rd Generation Partnership Project, Valbonne, France (Apr. 2018).
"3rd Generation Partnership Project; Technical Specification Group Radio Access Network; NR; Physical layer procedures for data (Release 15)," 3GPP TS 38.214 V15.1.0, pp. 1-77, 3rd Generation Partnership Project, Valbonne, France (Mar. 2018).

* cited by examiner

COMMUNICATIONS METHOD AND APPARATUS

CROSS-REFERENCE TO RELATED APPLICATIONS

This application is a continuation of International Application No. PCT/CN2019/086478, filed on May 10, 2019, which claims priority to Chinese Patent Application No. 201810451238.4, filed on May 11, 2018. The disclosures of the aforementioned applications are hereby incorporated by reference in their entireties.

TECHNICAL FIELD

Embodiments of this application relate to the field of communications technologies, and in particular, to a communications method and apparatus.

BACKGROUND

In a multi-user multiple-input multiple-output (MU-MIMO) technology, a network side device may simultaneously communicate with a plurality of terminal side devices, and a plurality of layers of MIMO may be allocated to different terminal side devices for carrying data of the different terminal side devices. In a current mobile communications system, for example, a new radio (NR) system, a network side does not notify a terminal side device of whether the terminal side device is in MU-MIMO mode and whether there is another co-scheduled terminal side device. However, according to a protocol, for a terminal side device, if the terminal side device has a co-scheduled terminal side device, a network side device uses different spreading codes on a same time-frequency resource, and sends demodulation reference signals (DM-RS) to the terminal side device and the co-scheduled terminal side device thereof. On the same time-frequency resource, a group of DM-RSs distinguished by using different spreading codes are in a same code division multiplexing (CDM) group. On any resource block (RB), the terminal side device may determine, based on a DM-RS received on the RB, whether there is a DM-RS of the co-scheduled terminal side device on the RB.

To obtain better channel estimation and data receiving performance, the network side device performs same precoding on the DM-RS and data, and may perform different precoding on the DM-RSs that are in a same CDM group. The network side device does not need to indicate the precoding of the DM-RS to the terminal side device, because the precoding of the DM-RS is the same as the precoding of the data. The terminal side device may consider the precoding as a part of a channel, in other words, the terminal side device may consider the precoding and an air interface channel as one equivalent channel. The terminal side device performs channel estimation of the equivalent channel by using the DM-RS, to demodulate the data.

However, when the terminal side device does not determine precoding of a DM-RS that is in a same CDM group as the DM-RS of the terminal side device, many problems are caused. For example, because the terminal side device does not know precoding of the co-scheduled terminal side device, when performing joint channel estimation, the terminal side device may only consider that different precoding may be performed on the DM-RS of the co-scheduled terminal side device on each RB on which the terminal side device receives the DM-RS. Consequently, a result of the channel estimation is inaccurate, and throughput performance of the network in MU-MIMO mode decreases.

Therefore, how the terminal side device determines whether precoding of other DM-RSs that are in a same CDM group as the DM-RS of the terminal side device is the same is an urgent problem to be resolved.

SUMMARY

Embodiments of this application provide a communications method and apparatus, to resolve a problem of how to determine whether precoding of other DM-RSs in a same CDM group is the same.

According to a first aspect, an embodiment of this application provides a communications method. The method includes: determining, by a first terminal side device, a frequency domain resource of a scheduled first PDSCH, where the first PDSCH corresponds to a first DM-RS on a first antenna port; and when the frequency domain resource includes N consecutive frequency domain units, and there is a second DM-RS on a second antenna port in each of L consecutive frequency domain units in the N frequency domain units, determining, by the first terminal side device, that precoding of the second DM-RS in each of the L frequency domain units is the same. The second DM-RS and the first DM-RS are in a same code division multiplexing CDM group, the second DM-RS corresponds to a second PDSCH scheduled for a second terminal side device, N is an integer greater than 1, and L is less than or equal to N, and is an integer greater than 1.

In the foregoing solution, when determining that there is the second DM-RS on the second antenna port in each of the L consecutive frequency domain units in the N frequency domain units, the first terminal side device may determine that the precoding of the second DM-RS in each of the L frequency domain units is the same, so that the first terminal side device can determine, without using other additional information, whether precoding of other DM-RSs that are in a same CDM group as the first DM-RS of the first terminal side device and that are on a same antenna port is the same. In this way, the first terminal side device can perform processing such as joint channel estimation by using the determining result. This method is easy to implement and system compatibility can be ensured.

In an optional implementation, N is 2.

In the foregoing solution, it may be preset in a protocol that precoding of DM-RSs in every two frequency domain units is the same. Because a minimum granularity for precoding the DM-RS is two frequency domain units, it can be ensured that the method is applicable to different precoding granularities.

In an optional implementation, N is determined based on a granularity of a precoding resource block group of the first terminal side device.

In the foregoing solution, N is determined based on the granularity of the precoding resource block group of the first terminal side device. Therefore, a value of N can be determined more flexibly.

In an optional implementation, when the granularity of the PRG of the first terminal side device is two frequency domain units, N is 2; when the granularity of the PRG of the first terminal side device is four frequency domain units or a bandwidth of the first PDSCH, N is 2; or when the granularity of the PRG of the first terminal side device is four frequency domain units or a bandwidth of the first PDSCH, N is 4.

In an optional implementation, N is preconfigured by the network side device.

In the foregoing solution, N may be preconfigured by the network side device based on an actual situation, so that a value of N can be determined more reasonably.

In an optional implementation, when the granularity of the PRG of the first terminal side device is two frequency domain units, N preconfigured by the network side device is 2: or when the granularity of the PRG of the first terminal side device is four frequency domain units or a bandwidth of the first PDSCH, N preconfigured by the network side device is 2 or 4.

In an optional implementation, when N=2, N is equal to L; or when N=4, L is 2, 3, or 4.

In an optional implementation, N is 4, and L is 2, and when there is a third DM-RS on the second antenna port in a first frequency domain unit in the N frequency domain units, the first terminal side device determines that precoding of the third DM-RS is the same as the precoding of the second DM-RS in each of the L frequency domain units, where the first frequency domain unit is in the N frequency domain units and is not adjacent to the L frequency domain units, the third DM-RS and the first DM-RS are in a same CDM group, and the third DM-RS on the second antenna port corresponds to a third PDSCH scheduled for a third terminal side device.

In the foregoing solution, for the inconsecutive first frequency domain units in the N frequency domain units, when determining that the foregoing condition is met, the first device may also determine whether precoding of the third DM-RS in the first frequency domain unit is the same as the precoding of the second DM-RS in the L frequency domain units.

According to a second aspect, an embodiment of this application provides a communications method, including: determining, by a network side device, a frequency domain resource of a first PDSCH scheduled for a first terminal side device, where the first PDSCH corresponds to a first DM-RS on a first antenna port; and when the frequency domain resource includes N consecutive frequency domain units, sending, by the network side device, the first DM-RS in each of L consecutive frequency domain units in the N frequency domain units, and sending a second DM-RS on a second antenna port in each of the L frequency domain units, where precoding of the second DM-RS sent in each of the L frequency domain units is the same. The second DM-RS and the first DM-RS are in a same code division multiplexing CDM group, the second DM-RS corresponds to a second PDSCH scheduled for a second terminal side device, N is an integer greater than 1, and L is less than or equal to N, and is an integer greater than 1.

In the foregoing solution, when determining to send the second DM-RS on the second antenna port in each of the L frequency domain units, the network side device may send the second DM-RSs with same precoding, so that the first terminal side device can determine, without using other additional information, that precoding of the second DM-RS on the second antenna port in each of the L frequency domain units is the same. This method is easy to implement and can further ensure system compatibility.

In an optional implementation, N is 2.

In an optional implementation, N is determined based on a granularity of a precoding resource block group PRG of the first terminal side device.

In an optional implementation, when the granularity of the PRG of the first terminal side device is two frequency domain units, N is 2: when the granularity of the PRG of the first terminal side device is four frequency domain units or a bandwidth of the first PDSCH, N is 2; or when the granularity of the PRG of the first terminal side device is four frequency domain units or a bandwidth of the first PDSCH, N is 4.

In an optional implementation, N is preconfigured by the network side device.

In an optional implementation, when the granularity of the PRG of the first terminal side device is two frequency domain units, N preconfigured by the network side device is 2: or when the granularity of the PRG of the first terminal side device is four frequency domain units or a bandwidth of the first PDSCH, N preconfigured by the network side device is 2 or 4.

In an optional implementation, when N=2, N is equal to L: or when N=4, L is 2, 3, or 4.

According to a third aspect, an embodiment of this application provides a terminal side device. The terminal side device includes a memory, a transceiver, and a processor. The memory is configured to store an instruction. The processor is configured to: execute the instruction stored in the memory, and control the transceiver to send and receive a signal. When executing the instruction stored in the memory, the processor is configured to perform the method in any one of the first aspect or the possible designs of the first aspect.

According to a fourth aspect, an embodiment of this application provides a terminal side device, configured to implement the method in any one of the first aspect or the possible designs of the first aspect. The terminal side device includes corresponding functional modules, for example, a processing unit and a transceiver unit, which are respectively configured to implement the steps in the foregoing method.

According to a fifth aspect, an embodiment of this application provides a network side device. The network side device includes a memory, a radio frequency circuit module, and a processor. The memory is configured to store an instruction. The processor is configured to: execute the instruction stored in the memory, and control the radio frequency circuit module to send and receive a signal. When executing the instruction stored in the memory, the processor is configured to perform the method in any one of the second aspect or the possible designs of the second aspect.

According to a sixth aspect, an embodiment of this application provides a network side device, configured to implement the method in any one of the second aspect or the possible designs of the second aspect. The terminal side device includes corresponding functional modules, for example, a processing unit and a transceiver unit, which are respectively configured to implement the steps in the foregoing method.

According to a seventh aspect, an embodiment of this application provides a computer-readable storage medium. The computer storage medium stores a computer-readable instruction. When a computer reads and executes the computer-readable instruction, the computer is enabled to perform the method in any one of the foregoing aspects or the possible designs of the foregoing aspects.

According to an eighth aspect, an embodiment of this application provides a computer program product. When a computer reads and executes the computer program product, the computer is enabled to perform the method in any one of the foregoing aspects or the possible designs of the foregoing aspects.

According to a ninth aspect, an embodiment of this application provides a chip. The chip is connected to a memory, and is configured to read and execute instruction code stored in the memory, to implement the method in any one of the foregoing aspects or the possible designs of the foregoing aspects.

According to a tenth aspect, an embodiment of this application provides a chip. The chip includes a memory, and is configured to read instruction code stored in the memory, to implement the method in any one of the foregoing aspects or the possible designs of the foregoing aspects.

DESCRIPTION OF EMBODIMENTS

The following describes embodiments of this application in detail with reference to the accompanying drawings of this specification.

The embodiments of this application may be applied to various mobile communications systems, for example, a NR system, a long term evolution (LTE) system, a long term evolution-advanced (LTE-A) system, an evolved long term evolution (eLTE) system, a future communications system, and another communications system. Specifically, this is not limited herein.

Figure 1:
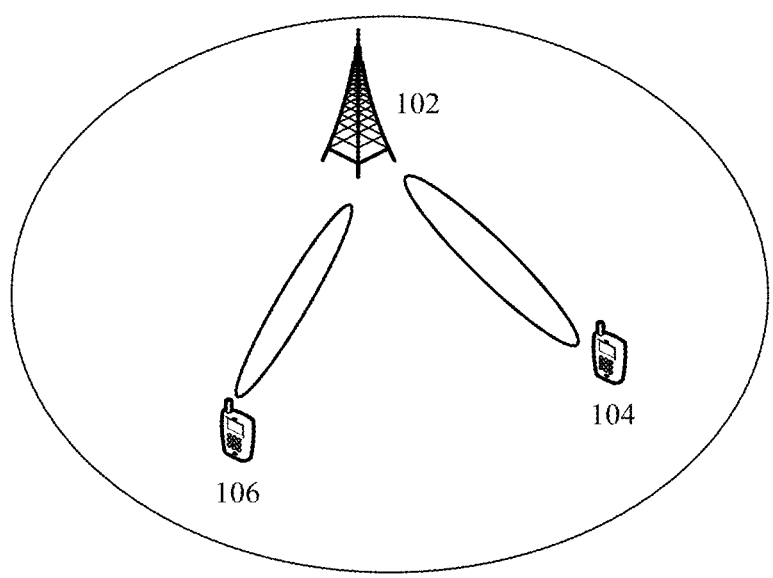
FIG. 1 is a schematic diagram of a communications system applicable to a communications method according to an embodiment of this application.

For ease of understanding the embodiments of this application, a communications system shown in FIG. 1 is first used as an example to describe in detail a communications system applicable to the embodiments of this application. FIG. 1 is a schematic diagram of a communications system applicable to a communications method according to an embodiment of this application. As shown in FIG. 1, the communications system 100 includes a network side device 102, a terminal side device 104, and a terminal side device 106. The network side device 102 may have a plurality of antennas, and the terminal side device may also have a plurality of antennas. The network side device 102 may communicate with the terminal side device 104 and the terminal side device 106 by using a multi-user multiple-input multiple-output (MU-MIMO) technology. For example, the network side device 102 respectively schedules physical downlink shared channels (PDSCH) for the terminal side device 104 and the terminal side device 106 for transmitting data, and the scheduled PDSCHs are located in a same frequency domain resource.

It should be noted that the communications system shown in FIG. 1 may further include another network side device and another terminal side device, which are not shown one by one herein.

It should be understood that the network side device 102 or the terminal side device 104 may further include a plurality of components (for example, a processor, a modulator, a multiplexer, a demodulator, and a demultiplexer) related to signal sending and receiving.

In the embodiments of this application, the terminal side device is a device having a wireless transceiver function or a chip that can be disposed in the device. The device having the wireless transceiver function may also be referred to as user equipment (UE), an access terminal, a subscriber unit, a subscriber station, a mobile station, a remote station, a remote terminal, a mobile device, a user terminal, a user agent, or a user apparatus. In actual application, the terminal side device in the embodiments of this application may be a mobile phone, a tablet computer (Pad), a computer having a wireless transceiver function, a virtual reality (VR) terminal, an augmented reality (AR) terminal, a wireless terminal in industrial control, a wireless terminal in self driving, a wireless terminal in remote medical, a wireless terminal in a smart grid, a wireless terminal in transportation safety, a wireless terminal in a smart city, a wireless terminal in a smart home, or the like. An application scenario is not limited in the embodiments of this application. In this application, the device having the wireless transceiver function and the chip that can be disposed in the device are collectively referred to as the terminal side device.

In the embodiments of this application, the network side device may be a radio access device in various standards, for example, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), an access point (AP) in a wireless fidelity (Wi-Fi) system, a wireless relay node, a wireless backhaul node, a transmission and reception point or a transmission point (transmission and reception point, TRP or TP), or the like. The network side device may alternatively be a gNB or a transmission point (TRP or TP) in a 5G (NR) system, at least one antenna panel of a base station in a 5G system, a network node configured to implement a gNB or a transmission point, for example, a baseband unit (BBU), or a DU in a centralized-distributed (CU-DU) architecture, or the like. One antenna panel corresponds to at least one antenna port.

A network architecture and a service scenario described in the embodiments of this application are intended to describe the technical solutions in the embodiments of this application more clearly, and do not constitute a limitation on the technical solutions provided in the embodiments of this application. A person of ordinary skill in the art may know that: With the evolution of the network architecture and the emergence of new service scenarios, the technical solutions provided in the embodiments of this application are also applicable to similar technical problems.

Figure 2:
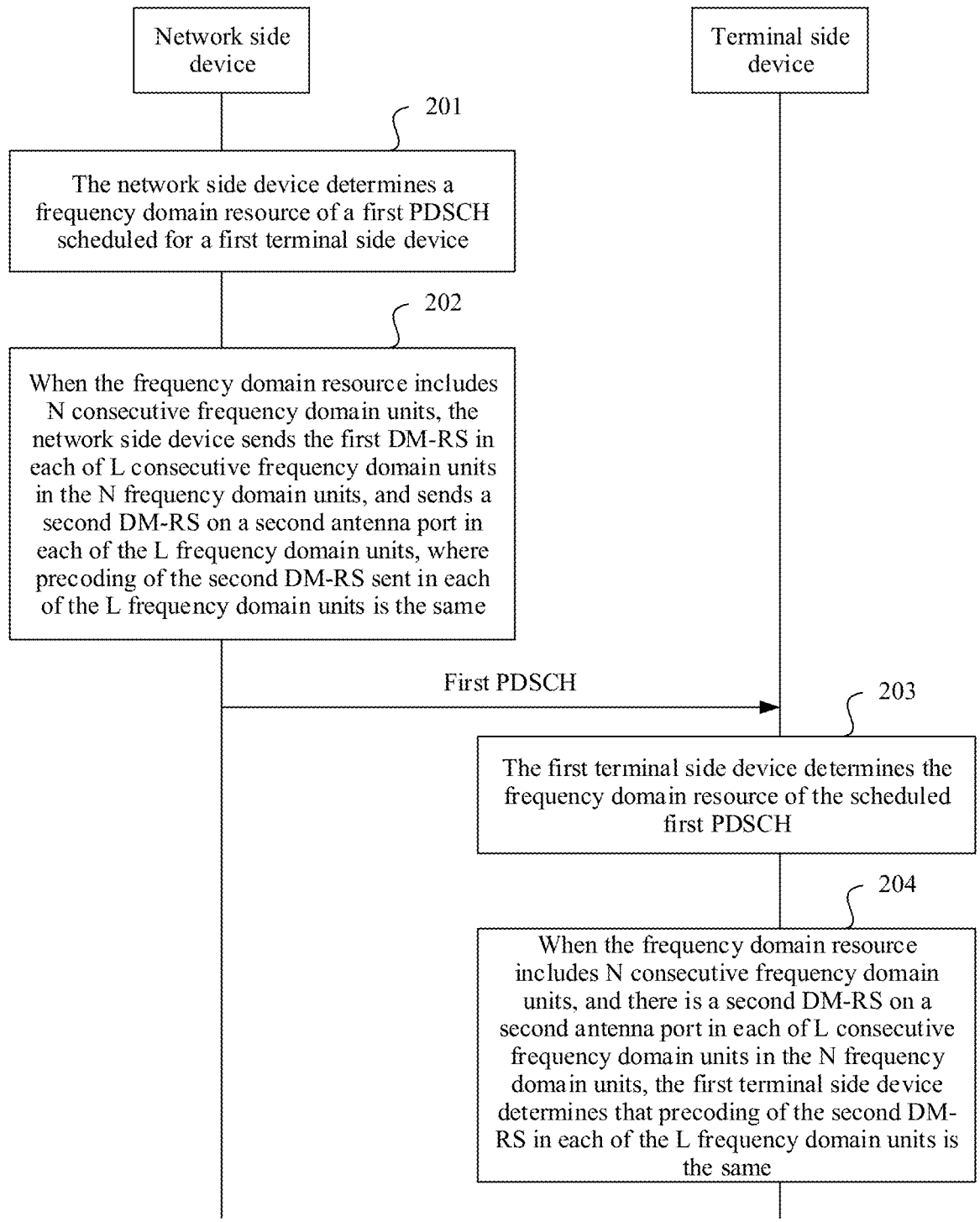
FIG. 2 is a schematic flowchart of a communications method according to an embodiment of this application.

FIG. 2 is a schematic flowchart of a communications method according to an embodiment of this application. The method includes the following steps.

Step 201: A network side device determines a frequency domain resource of a first PDSCH scheduled for a first terminal side device.

The first PDSCH corresponds to a first DM-RS on a first antenna port.

Step 202: When the frequency domain resource includes N consecutive frequency domain units, the network side device sends the first DM-RS in each of L consecutive frequency domain units in the N frequency domain units, and sends a second DM-RS on a second antenna port in each of the L frequency domain units, where precoding of the second DM-RS sent in each of the L frequency domain units is the same.

In an NR system, an antenna port is defined as having the following characteristic: On a same antenna port, a channel (for example, the PDSCH in this embodiment of this application) for transmitting a signal may be inferred from a channel for transmitting another signal (for example, the DM-RS in this embodiment of this application).

The second DM-RS on the second antenna port and the first DM-RS on the first antenna port are in a same CDM group, the second DM-RS corresponds to a second PDSCH scheduled for a second terminal side device, the first DM-RS on the first antenna port corresponds to the first PDSCH scheduled for the first terminal side device, N is an integer greater than 1, and L is less than or equal to N, and is an integer greater than 1. The first DMRS and the scheduled first PDSCH are located on the first antenna port, and the second DMRS and the scheduled second PDSCH are located on the second antenna port.

It should be noted that the second DM-RS on the second antenna port may correspond to a second PDSCH scheduled for one second terminal side device, or may correspond to second PDSCHs scheduled for a plurality of second terminal side devices.

In this embodiment of this application, the frequency domain unit may be an RB, or may be a frequency domain unit similar to an RB, which is not illustrated herein by examples. It should be noted that, in an NR system, an RB is a concept in frequency domain, and one RB includes 12 subcarriers.

One CDM group may correspond to one group of antenna ports, and DM-RSs on the group of antenna ports may occupy a same time-frequency resource. For example, a correspondence between an antenna port and a CDM group may be shown in Table 1.

TABLE 1

| Antenna port P | CDM group λ |
|---|---|
| 0 | 0 |
| 1 | 0 |
| 2 | 1 |
| 3 | 1 |
| 4 | 0 |
| 5 | 0 |
| 6 | 1 |
| 7 | 1 |

Figure 3:
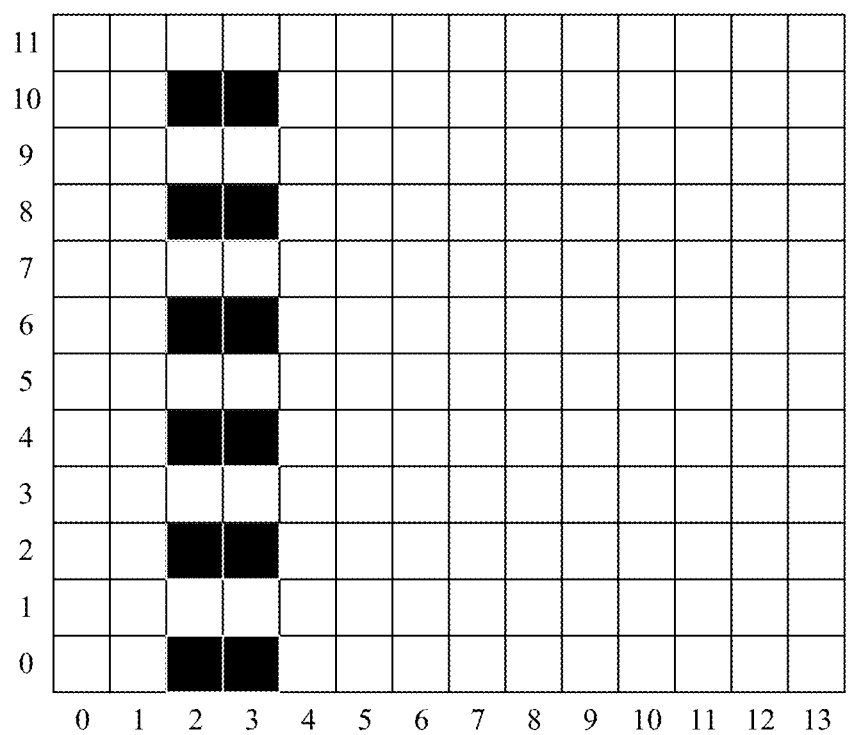
FIG. 3 is a schematic diagram of a time-frequency resource occupied by a DM-RS on an antenna port according to an embodiment of this application.

In Table 1, λ indicates a CDM group, and antenna ports P corresponding to a same λ correspond to one CDM group. In Table 1, when the antenna ports P are 0, 1, 4, and 5, the antenna ports correspond to one CDM group; and when the antenna ports P are 2, 3, 6, and 7, the antenna ports correspond to one CDM group. When the antenna ports P are 0, 1, 4, and 5, time-frequency resources occupied by DM-RSs on each of the antenna ports may be the same. For details, refer to FIG. 3.

Certainly, Table 1 is merely an example, and the correspondence between an antenna port and a CDM group may alternatively be in another form. Details are not described herein.

It should be noted that the first antenna port and the second antenna port are different antenna ports.

Step 203: The first terminal side device determines the frequency domain resource of the scheduled first PDSCH.

Step 204: When the frequency domain resource includes N consecutive frequency domain units, and there is a second DM-RS on a second antenna port in each of L consecutive frequency domain units in the N frequency domain units, the first terminal side device determines that precoding of the second DM-RS in each of the L frequency domain units is the same.

In this embodiment of this application, when determining that there is the second DM-RS on the second antenna port in each of the L consecutive frequency domain units in the N frequency domain units, the first terminal side device may determine that the precoding of the second DM-RS in each of the L frequency domain units is the same, so that the first terminal side device determines, without using other additional information, whether precoding of other DM-RSs that are in a same CDM group as the first DM-RS sent to the first terminal side device is the same. This method is easy to implement and system compatibility can be ensured.

In step 201, the frequency domain resource of the first PDSCH may be scheduled in two manners: type 0 and type 1.

In type 0, a downlink bandwidth part (BWP) is grouped based on a granularity of a resource block group (RBG), and then a bitmap is used to indicate whether each resource block group is on the first PDSCH.

The BWP is a segment of consecutive frequency domain resources allocated by the network side device to the terminal side device, and includes at least one frequency domain unit. When the frequency domain unit is an RB, a number of a starting RB in the BWP is $N_{BWP}^{start}$, and $N_{BWP}^{start}$ is obtained by the terminal side device by using higher layer signaling. $N_{BWP}^{start}$ is a common resource block (CRB) number relative to a frequency domain reference point A. The CRB number starts from the frequency domain reference point A. The terminal side device obtains a location of the point A by using higher layer signaling. The higher layer signaling includes but is not limited to radio resource control (RRC) signaling and the like.

In type 1, frequency domain resources of any length starting from any RB in the BWP are allocated to a terminal side device, and are indicated by using a resource indication value (RIV).

The network side device may send, to the first terminal side device by using downlink control information (DCI), frequency domain information of the frequency domain resource of the first PDSCH scheduled for the first terminal side device. The DCI may further include information such as an antenna port corresponding to the DM-RS and a spreading code of the DM-RS.

Correspondingly, the first terminal side device may determine, based on the frequency domain information in the DCI, an RB included in the frequency domain resource of the first PDSCH and a location, of the RB included in the frequency domain resource of the first PDSCH, in the BWP allocated to the first terminal side device.

It should be noted that when the frequency domain unit is an RB, the network side device may perform precoding at different granularities, and a granularity of a precoding resource block group (PRG) is two RBs, four RBs, a bandwidth of the PDSCH, or the like. Therefore, in this embodiment of this application, CRB numbers of the N consecutive frequency domain units may be N*T to N*T+N−1, where T is an integer, and a value of T is determined based on the frequency domain resource of the PDSCH.

In this embodiment of this application, the first terminal side device may further determine an antenna port by using the DCI, and the antenna port corresponds to the first DM-RS on the first PDSCH.

In step 201 to step 204, there may be a plurality of cases for values of N and L.

In the first possible case, N is equal to L, and N is 2. In this case, it may be preset in a protocol that precoding of DM-RSs in every two frequency domain units is the same.

In the second possible case, N is determined based on a granularity of a precoding resource block group (PRG) of the first terminal side device.

Optionally, when the granularity of the PRG of the first terminal side device is two frequency domain units, N is equal to L, and N is 2: when the granularity of the PRG of the first terminal side device is four frequency domain units or a bandwidth of the first PDSCH, N is equal to L, and N is 2: or when the granularity of the PRG of the first terminal side device is four frequency domain units or a bandwidth of the first PDSCH, N is 4, and L is 2, 3, or 4.

In the foregoing solution, a value of N is determined based on the granularity of the PRG of the first terminal side device, thereby improving flexibility of the solution.

In the third possible case, N is preconfigured by the network side device.

Optionally, when the granularity of the PRG of the first terminal side device is two frequency domain units, N preconfigured by the network side device is 2, and N is equal to L: when the granularity of the PRG of the first terminal side device is four frequency domain units or a bandwidth of the first PDSCH, N preconfigured by the network side device is 2, and N is equal to L: or when the granularity of the PRG of the first terminal side device is four frequency domain units or a bandwidth of the first PDSCH, N preconfigured by the network side device is 4, and L is 2, 3, or 4. When N is not preconfigured by the network side device, N may be equal to 2 by default, and N is equal to L.

The following provides descriptions separately according to different cases.

In the first possible scenario, L is equal to N, and N is 2 or 4.

In this scenario, the network side device sends the first DM-RS on the first antenna port of the first terminal side device in each of the L frequency domain units.

When the network side device sends, in the L frequency domain units, a DM-RS that is in a same CDM group as the first DM-RS on the first antenna port, the network side device may perform any one of the following possible operations based on an actual situation:

First possible operation: The network side device simultaneously schedules the L frequency domain units to one second terminal side device, and sends the second DM-RS on the second antenna port in each of the L frequency domain units.

In this case, the second DM-RS on the second antenna port corresponds to a second PDSCH scheduled for the second terminal side device.

Figure 4A:
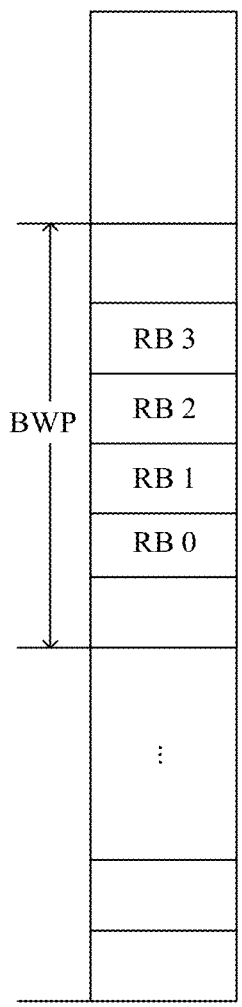
FIG. 4(a) and FIG. 4(b) are schematic diagrams of time-frequency resource allocation according to an embodiment of this application.

For example, as shown in FIG. 4(a), L is 4, and the frequency domain unit is an RB. In a BWP allocated by the network side device to the first terminal side device, a frequency domain resource for scheduling the first PDSCH includes consecutive RB 0 to RB 3. The network side device sends the first DM-RS on the first antenna port of the first terminal side device in each RB of the RB 0) to the RB 3, and sends the second DM-RS on the second antenna port on a same time-frequency resource on which the first DM-RS is sent.

Second possible operation: The network side device may schedule the L frequency domain units to at least two second terminal side devices, and encode, by using same precoding, the second DM-RS on the second antenna port that is sent in each of the L frequency domain units. One frequency domain unit or at least one consecutive frequency domain unit is scheduled to each second terminal side device.

According to the foregoing method, the precoding of the second DM-RS sent by the network side device in each of the L frequency domain units is the same. In this case, the second DM-RS on the second antenna port corresponds to second PDSCHs scheduled for a plurality of second terminal side devices.

Figure 4B:
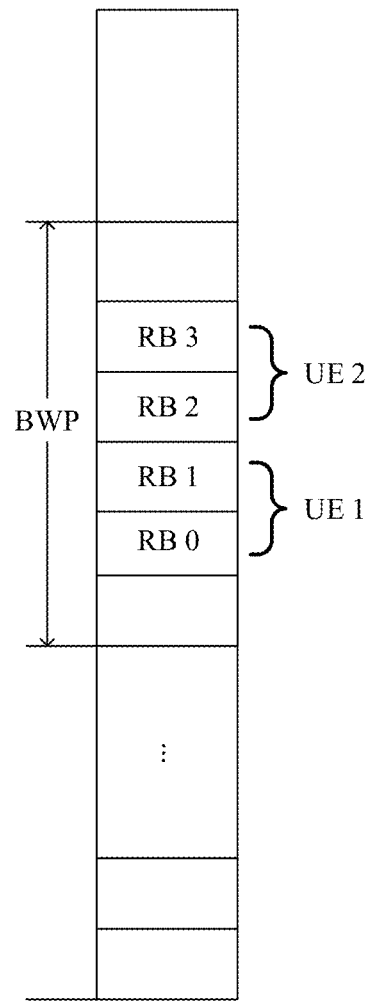

For example, as shown in FIG. 4(b), L is 4, and the frequency domain unit is an RB. In a BWP allocated by the network side device to the first terminal side device, a frequency domain resource for scheduling the first PDSCH includes consecutive RB 0 to RB 3, a frequency domain resource for scheduling the second PDSCH of a second terminal side device UE 1 includes the RB 0 and the RB 1, and a frequency domain resource for scheduling a second PDSCH of a second terminal side device UE 2 includes the RB 2 and the RB 3. The network side device sends the first DM-RS on the first antenna port of the first terminal side device in each RB of the RB 0 to the RB 3, and sends, on a same time-frequency resource on which the first DM-RS is sent, the second DM-RS on the second antenna port that is encoded by using the same precoding. The network side device schedules the RB 0 and the RB 1 to the PDSCH of the UE 1, and schedules the RB 3 and the RB 2 to the PDSCH of the UE 2. That is, the second DM-RSs on the second antenna ports of the RB 0 and the RB 1 correspond to the PDSCH of the UE 1, and the second DM-RSs on the second antenna ports of the RB 2 and the RB 3 correspond to the PDSCH of the UE 2.

Correspondingly, after the first terminal side device determines the frequency domain resource, when determining that the CDM group on the first antenna port further includes the second antenna port, the first terminal side device may determine whether there is the second DM-RS on the second antenna port in each frequency domain unit of the frequency domain resource.

Figure 5:
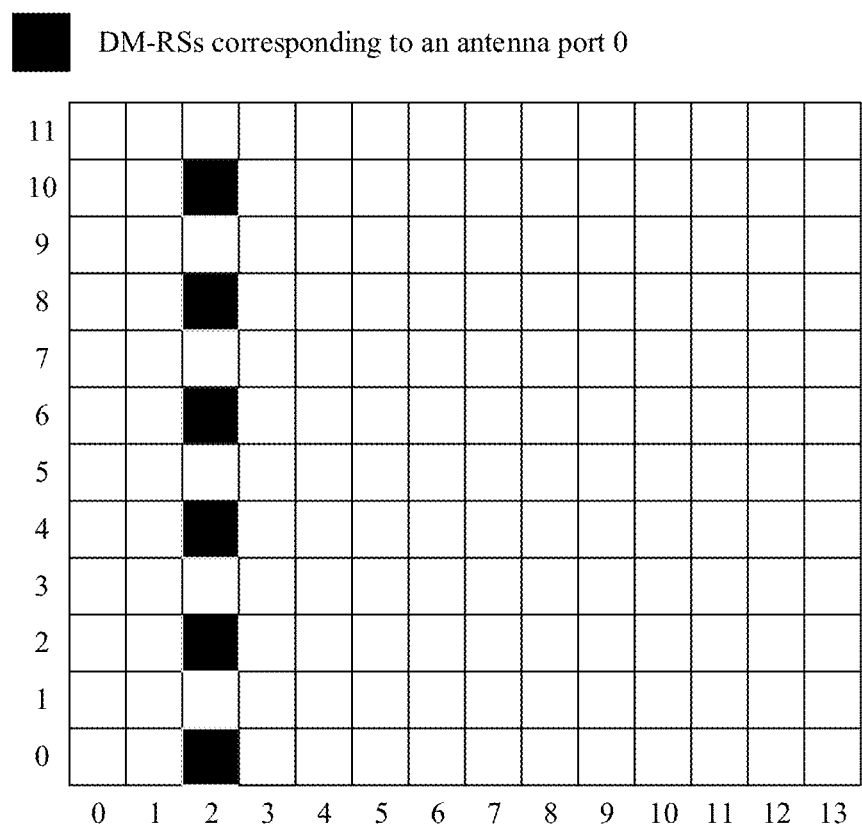
FIG. 5 is a schematic diagram of a time-frequency resource occupied by a DM-RS on an antenna port according to an embodiment of this application.

For example, a resource unit is an RB. A DM-RS on an antenna port whose port number is 0 and a DM-RS on an antenna port whose port number is 1 are in a same CDM group. When an antenna port value in the DCI received by the first terminal side device is 0, the first terminal side device determines that an allocated port number of the first antenna port is 0 and the first antenna port is denoted as $p_0$. Therefore, on the time-frequency resource on which the DM-RS on the first antenna port is sent, there may be a DM-RS on the second antenna port whose port number is 1, and the second antenna port is denoted as $p_1$. The following provides only a description in which the port number of the second antenna port is 1. Other cases are not described again. That the first terminal side device determines, based on the received DCI, a quantity of RSs in the DM-RSs on the first antenna port occupied in each resource unit may be shown in FIG. 5.

When a spreading code allocated to the first terminal side device is (1, 1), and when there is a co-scheduled terminal side device of the first terminal side device (that is, the second terminal side device), a spreading code of the second terminal side device is (1, −1).

The first terminal side device receives a signal in each frequency domain unit, and despreads the signal by using a spreading code of the second antenna port. For a frequency domain unit, a first DM-RS that is on a first antenna port and that is received on a kth resource element (RE) in the frequency domain unit is $h_{p_0,k}$, and a second DM-RS that is on a second antenna port and that is received on the kth RE in the frequency domain unit is $h_{p_1,k}$. It may be assumed that $h_{p_0,0}=h_{p_0,2}h_{p_1,k}=h_{p_1,2}$, and the like. When there is no second terminal side device, a despreading result obtained by using (1, −1) is $h_{p_0,0}-h_{p_0,2}=0$. When there is a second terminal side device, a despreading result obtained by using (1, −1) is $(h_{p_0,0}+h_{p_1,0})-(h_{p_0,2}-h_{p_1,2})=2h_{p_1,0}$. For a despreading result of a received signal at another location, refer to Table 2. A modulo operation is performed on three despreading results in one frequency domain unit, to calculate an average value, and the average value is compared with a preset threshold. If the average value is greater than the preset threshold, it is determined that there is the second DM-RS of the second antenna port in the frequency domain unit; or if the average value is less than or equal to the preset threshold, it is determined that there is no second DM-RS of the second antenna port in the frequency domain unit. One RE occupies one symbol in time domain, and occupies one subcarrier in frequency domain.

TABLE 2

| RE | Received signal when there is no second terminal side device | Received signal when there is a second terminal side device |
|---|---|---|
| 0 | $h_{p_0,0}$ | $h_{p_0,0} + h_{p_1,0}$ |
| 2 | $h_{p_0,2}$ | $h_{p_0,2} - h_{p_1,2}$ |
| 4 | $h_{p_0,4}$ | $h_{p_0,4} + h_{p_1,4}$ |
| 6 | $h_{p_0,6}$ | $h_{p_0,6} - h_{p_1,6}$ |
| 8 | $h_{p_0,8}$ | $h_{p_0,8} + h_{p_1,8}$ |
| 10 | $h_{p_0,10}$ | $h_{p_0,10} - h_{p_1,10}$ |

The first terminal side device may determine, based on the foregoing method, whether there is the second DM-RS on the second antenna port in each resource unit.

The first terminal side device determines that there is the second DM-RS on the second antenna port in each of the L frequency domain units, and may determine that precoding of the second DM-RSs in each of the L frequency domain units is the same.

It should be noted that, it can be learned from the foregoing description that the second DM-RS in the L frequency domain units may correspond to one second PDSCH scheduled for one second terminal side device. In other words, all the L frequency domain units are scheduled to the second PDSCH of the second terminal side device. The second DM-RS in the L frequency domain units may further correspond to second PDSCHs scheduled for a plurality of second terminal side devices.

In the second possible scenario, N is 4, and L is 2 or 3.

In this scenario, the network side device sends the first DM-RS on the first antenna port of the first terminal side device in each of the N frequency domain units.

When the network side device sends, in the N frequency domain units, a DM-RS on an antenna port that is in a same CDM group as the first antenna port, the network side device may perform any of the following possible operations based on an actual situation:

First, the network side device simultaneously schedules L consecutive frequency domain units in the N frequency domain units to one second terminal side device, and sends the second DM-RS on the second antenna port in each of the L frequency domain units. A frequency domain unit other than the L frequency domain units in the N frequency domain units is not scheduled to the second terminal side device.

In this case, the second DM-RS on the second antenna port corresponds to a second PDSCH scheduled for the second terminal side device.

Figure 6A:
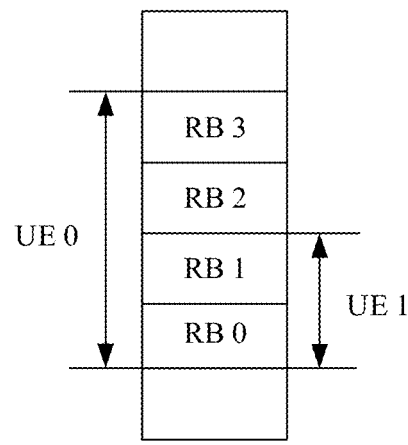
FIG. 6(a) and FIG. 6(b) are schematic diagrams of time-frequency resource allocation according to an embodiment of this application.

For example, as shown in FIG. 6(a), N is 4, L is 2, and the frequency domain unit is an RB. In a BWP allocated by the network side device to a first terminal side device UE 0, a frequency domain resource for scheduling the first PDSCH includes consecutive RB 0 to RB 3, and a frequency domain resource for scheduling the second PDSCH of a second terminal side device UE 1 includes the RB 0 and the RB 1. The network side device sends the first DM-RS on the first antenna port of the first terminal side device in each RB of the RB 0 to the RB 3, and sends the second DM-RS on the second antenna port on a time-frequency resource on which the first DM-RS is sent in the RB 0 and the RB 1.

Second, the network side device may schedule the L frequency domain units to at least two second terminal side devices, and encode, by using same precoding, the second DM-RS on the second antenna port that is sent in each of the L frequency domain units. One frequency domain unit or at least one consecutive frequency domain unit is scheduled to each second terminal side device.

Figure 6B:
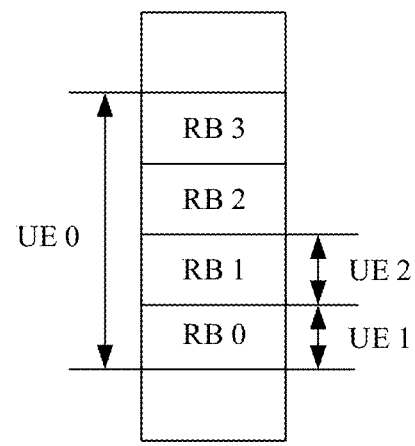

For example, as shown in FIG. 6(b), N is 4, L is 2, and the frequency domain unit is an RB. In a BWP allocated by the network side device to a first terminal side device UE 0, a frequency domain resource for scheduling the first PDSCH includes consecutive RB 0 to RB 3, a frequency domain resource for scheduling the second PDSCH of a second terminal side device UE 1 includes the RB 0, and a frequency domain resource for scheduling a second PDSCH of the second terminal side device UE 2 includes the RB 1. The network side device sends the first DM-RS on the first antenna port of the first terminal side device in each RB of the RB 0 to the RB 3, and sends, on a time-frequency resource on which the first DM-RS is sent in the RB 0 and the RB 1, the second DM-RS on the second antenna port by using same precoding.

According to the foregoing method, the precoding of the second DM-RS sent by the network side device in each of the L frequency domain units is the same. In this case, the second DM-RS on the second antenna port corresponds to second PDSCHs scheduled for a plurality of second terminal side devices.

Correspondingly, after the first terminal side device determines the frequency domain resource, a step performed by the first terminal side device is the same as a step performed in the first possible scenario. Details are not described herein again.

Figure 7:
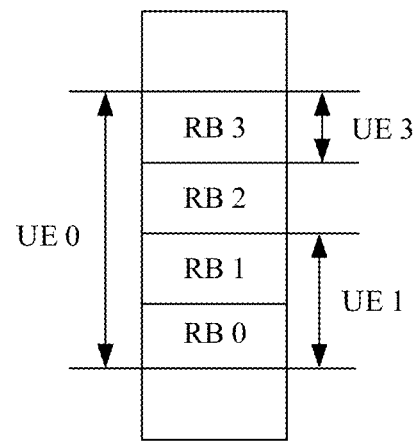
FIG. 7 is a schematic diagram of time-frequency resource allocation according to an embodiment of this application.

In this scenario, N is not equal to L, and if there is a third DM-RS on the second antenna port in a frequency domain unit that is in the N frequency domain units and that is not adjacent to the L frequency domain units, and the third DM-RS on the second antenna port and the first DM-RS on the first antenna port are in a same CDM group, the frequency domain unit is referred to as a first frequency domain unit in this embodiment of this application. For example, as shown in FIG. 7, N is 4, L is 2, and the frequency domain unit is an RB. The network side device sends the first DM-RS on the first antenna port in the RB 0 to the RB 3, sends the second DM-RS on the second antenna port in the RB 0) and the RB 1, and sends the third DM-RS on the second antenna port in the RB 3. When the third DM-RS on the second antenna port and the first DM-RS on the first antenna port are in a same CDM group, the RB 3 is the first frequency domain unit.

When the third DM-RS on the second antenna port sent by the network side device in the first frequency domain unit and the first DM-RS on the first antenna port are in a same CDM group, precoding of the third DM-RS may be the same as or different from precoding of the second DM-RS on the second antenna port. This is not limited in this embodiment of this application. The third DM-RS on the second antenna port corresponds to a third PDSCH scheduled for a third terminal side device. The third terminal side device and the second terminal side device may be a same device, or may be different devices.

Correspondingly, when the precoding of the third DM-RS on the second antenna port sent by the network side device in the first frequency domain unit is the same as the precoding of the second DM-RS on the second antenna port sent in the first frequency domain unit, when determining that there is a third DM-RS on the second antenna port in the first frequency domain unit in the N frequency domain units, the first terminal side device may determine that the precoding of the third DM-RS is the same as the precoding of the second DM-RS in each of the L frequency domain units. The third DMRS and the scheduled third PDSCH are located on the second antenna port.

Alternatively, when the precoding of the third DM-RS on the second antenna port sent by the network side device in the first frequency domain unit is different from the precoding of the second DM-RS on the second antenna port sent in the first frequency domain unit, when determining that there is a third DM-RS on the second antenna port in the first frequency domain unit in the N frequency domain units, the first terminal side device may determine that the precoding of the third DM-RS is different from the precoding of the second DM-RS in each of the L frequency domain units.

When performing channel estimation based on the first DM-RS, the first terminal side device needs to calculate a frequency-domain Wiener filtering coefficient. A higher calculation precision of the frequency-domain Wiener filtering coefficient indicates a more accurate channel estimation result.

The frequency-domain Wiener filtering coefficient W winner may satisfy the following formula:

$$W_{winner} = R_{data,RS}(R_{RS,RS} + \delta_N^2) \quad (1), \text{where}$$

$R_{data,RS} R_{data,rs}$ indicates a cross-correlation function between received data and a DM-RS, and $R_{RS,RS} R_{rs,rs}$ indicates an autocorrelation function between DM-RSs in one CDM group.

The autocorrelation function is expressed as:

$$R_{RS,RS} = \begin{pmatrix} r_{1,1} & r_{1,2} & L & r_{1,K} \\ r_{2,1} & r_{2,2} & L & r_{2,K} \\ M & M & O & M \\ r_{K,1} & r_{K,2} & L & r_{K,K} \end{pmatrix},$$

where

K is a quantity of DM-RSs with same precoding. When m is an odd number and n is an even number:

$$r_{m,n} = E\left(\left(\sqrt{P_{p_0}}\, h_{p_0,m} + \sqrt{P_{p_1}}\, h_{p_1,m}\right)\left(\sqrt{P_{p_0}}\, h_{p_0,n} - \sqrt{P_{p_1}}\, h_{p_1,n}\right)^H\right)$$

-continued $$= P_{p_0} E(h_{p_0,m} h_{p_0,n}^H) - P_{p_1} E(h_{p_1,m} h_{p_1,n}^H)$$

When m is an odd number and n is an odd number:

$$r_{m,n} = E\left(\left(\sqrt{P_{p_0}}\, h_{p_0,m} + \sqrt{P_{p_1}}\, h_{p_1,m}\right)\left(\sqrt{P_{p_0}}\, h_{p_0,n} + \sqrt{P_{p_1}}\, h_{p_1,n}\right)^H\right)$$

$$= P_{p_0} E(h_{p_0,m} h_{p_0,n}^H) + P_{p_1} E(h_{p_1,m} h_{p_1,n}^H)$$

$$= 2 P_{p_0} E(h_1 h_2^H)$$

When m is an even number and n is an even number:

$$r_{m,n} = E\left(\left(\sqrt{P_{p_0}}\, h_{p_0,m} - \sqrt{P_{p_1}}\, h_{p_1,m}\right)\left(\sqrt{P_{p_0}}\, h_{p_0,n} - \sqrt{P_{p_1}}\, h_{p_1,n}\right)^H\right)$$

$$= P_{p_0} E(h_{p_0,m} h_{p_0,n}^H) + P_{p_1} E(h_{p_1,m} h_{p_1,n}^H)$$

$$= 2 P_{p_0} E(h_1 h_2^H)$$

$P_{p_0}$ is a signal received power of the terminal side device on an antenna port i.

A larger value of K in the autocorrelation function indicates a more accurate result of the autocorrelation function and a higher calculation precision of the obtained frequency-domain Wiener filtering coefficient. To ensure that K can be a relatively large value, when the network side device sends, in each of the L frequency domain units, a DM-RS that is in a same CDM group as the first DM-RS on the first antenna port, precoding of these DM-RSs needs to be the same as much as possible.

For example, when N is 2 and L is 2, the network side device sends, in each of the L frequency domain units, a DM-RS that is in a same CDM group as the first DM-RS on the first antenna port. When precoding of the DM-RS that is in a same CDM group as the first DM-RS in each frequency domain unit is different, the first terminal side device cannot perform joint channel estimation on the L frequency domain units, and instead perform joint channel estimation only in each of the L frequency domain units. In this case, the value of K can only be 6. When precoding of the DM-RS that is in a same CDM group as the first DM-RS in each frequency domain unit is the same, the first terminal side device may perform joint channel estimation on the L frequency domain units, where K=12. During joint channel estimation, a larger quantity of used DM-RSs can filter out more noise, thereby improving channel estimation performance.

Figure 8:
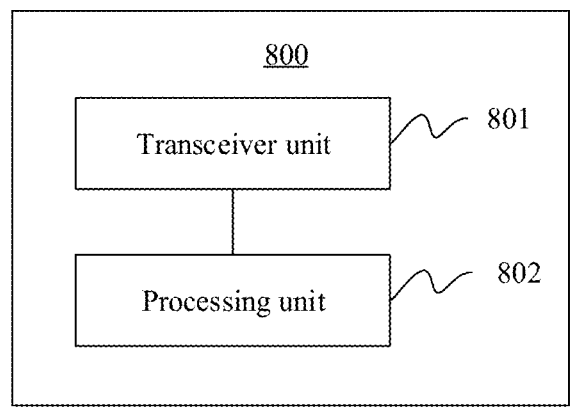
FIG. 8 is a schematic structural diagram of a communications apparatus according to an embodiment of this application.

FIG. 8 is a schematic structural diagram of a communications apparatus according to an embodiment of this application. The communications apparatus may be configured to perform the actions of the terminal side device or the network side device in the foregoing method embodiments.

The communications apparatus 800 includes a transceiver unit 801 and a processing unit 802.

When the communications apparatus 800 performs an action of the terminal side device in the procedure shown in FIG. 2:

the processing unit 802 is configured to determine a frequency domain resource of a scheduled first physical downlink shared channel PDSCH, where the first PDSCH corresponds to a first demodulation reference signal DM-RS on a first antenna port; and the transceiver unit 801 is configured to: when the frequency domain resource includes N consecutive frequency domain units, and there is a second DM-RS on a second antenna port in each of L consecutive frequency domain units in the N frequency domain units, determine that precoding of the second DM-RS in each of the L frequency domain units is the same.

The second DM-RS and the first DM-RS are in a same code division multiplexing CDM group, the second DM-RS corresponds to a second PDSCH scheduled for a second terminal side device, N is an integer greater than 1, and L is less than or equal to N, and is an integer greater than 1.

In an optional implementation, N is 2.

In the foregoing solution, it may be preset in a protocol that precoding of DM-RSs in every two frequency domain units is the same. Because a minimum granularity for precoding the DM-RS is two frequency domain units, it can be ensured that the method is applicable to different precoding granularities.

In an optional implementation, N is determined based on a granularity of a precoding resource block group of the first terminal side device.

In an optional implementation, when the granularity of the PRG of the first terminal side device is two frequency domain units, N is 2: when the granularity of the PRG of the first terminal side device is four frequency domain units or a bandwidth of the first PDSCH, N is 2; or when the granularity of the PRG of the first terminal side device is four frequency domain units or a bandwidth of the first PDSCH, N is 4.

In an optional implementation, N is preconfigured by the network side device.

In an optional implementation, when the granularity of the PRG of the first terminal side device is two frequency domain units, N preconfigured by the network side device is 2: or when the granularity of the PRG of the first terminal side device is four frequency domain units or a bandwidth of the first PDSCH, N preconfigured by the network side device is 2 or 4.

In an optional implementation, when N=2, N is equal to L: or when N=4, L is 2, 3, or 4.

In an optional implementation, N is 4, and L is 2, and when there is a third DM-RS on the second antenna port in a first frequency domain unit in the N frequency domain units, the first terminal side device determines that precoding of the third DM-RS is the same as the precoding of the second DM-RS in each of the L frequency domain units.

The first frequency domain unit is in the N frequency domain units and is not adjacent to the L frequency domain units, the third DM-RS and the first DM-RS are in a same CDM group, and the third DM-RS on the second antenna port corresponds to a third PDSCH scheduled for a third terminal side device.

In the foregoing solution, for the inconsecutive first frequency domain units in the N frequency domain units, when determining that the foregoing condition is met, the first device may also determine whether precoding of the third DM-RS in the first frequency domain unit is the same as the precoding of the second DM-RS in the L frequency domain units.

When the communications apparatus 800 performs an action of the network side device in the procedure shown in FIG. 2:

the processing unit 802 is configured to determine a frequency domain resource of a first physical downlink shared channel PDSCH scheduled for a first terminal side device, where the first PDSCH corresponds to a first demodulation reference signal DM-RS on a first antenna port; and the transceiver unit 801 is configured to: when the frequency domain resource includes N consecutive frequency domain units, send the first DM-RS in each of L consecutive frequency domain units in the N frequency domain units, and send a second DM-RS on a second antenna port in each of the L frequency domain units, where precoding of the second DM-RS sent in each of the L frequency domain units is the same.

The second DM-RS and the first DM-RS are in a same code division multiplexing CDM group, the second DM-RS corresponds to a second PDSCH scheduled for a second terminal side device, N is an integer greater than 1, and L is less than or equal to N, and is an integer greater than 1.

In an optional implementation, N is 2.

In an optional implementation, N is determined based on a granularity of a precoding resource block group PRG of the first terminal side device.

In an optional implementation, when the granularity of the PRG of the first terminal side device is two frequency domain units, N is 2: when the granularity of the PRG of the first terminal side device is four frequency domain units or a bandwidth of the first PDSCH, N is 2; or when the granularity of the PRG of the first terminal side device is four frequency domain units or a bandwidth of the first PDSCH, N is 4.

In an optional implementation, N is preconfigured by the network side device.

In an optional implementation, when the granularity of the PRG of the first terminal side device is two frequency domain units, N preconfigured by the network side device is 2: or when the granularity of the PRG of the first terminal side device is four frequency domain units or a bandwidth of the first PDSCH, N preconfigured by the network side device is 2 or 4.

In an optional implementation, when N=2, N is equal to L: or when N=4, L is 2, 3, or 4.

Figure 9:
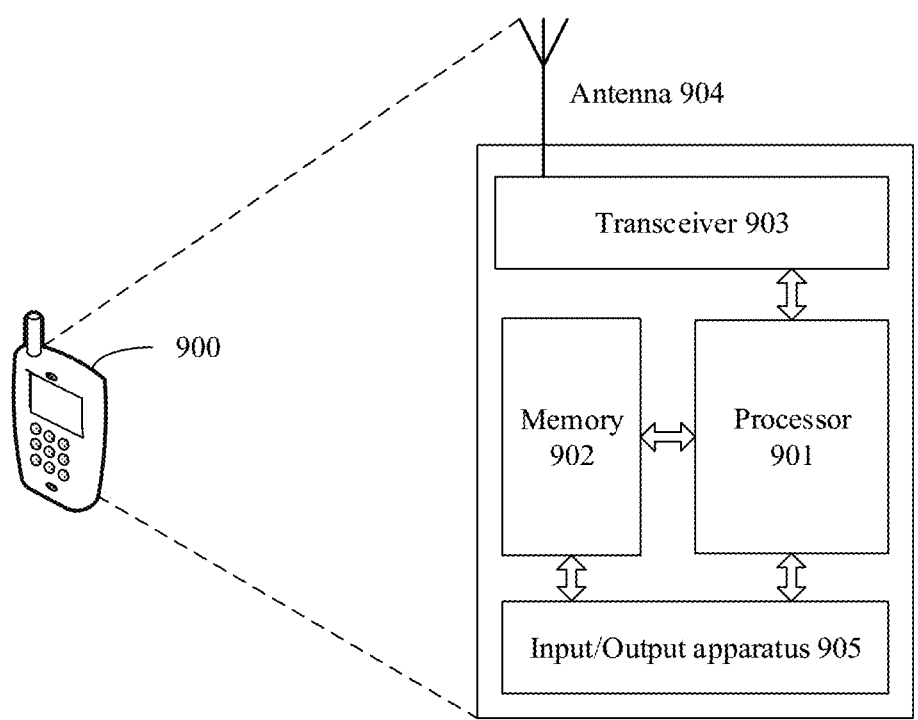
FIG. 9 is a schematic structural diagram of a terminal side device according to an embodiment of this application.

FIG. 9 is a schematic structural diagram of a terminal side device according to an embodiment of this application. A terminal side device shown in FIG. 9 may be an implementation of a hardware circuit of the communications apparatus shown in FIG. 8. The terminal side device may be applicable to the flowchart shown in FIG. 2 or FIG. 5, and performs the functions of the terminal side device in the foregoing method embodiments. For ease of description, FIG. 9 shows only main components of the terminal side device. As shown in FIG. 9, the terminal side device 900 includes a processor 901, a memory 902, a transceiver 903, an antenna 904, and an input/output apparatus 905. The processor 901 is mainly configured to: process a communication protocol and communication data, control an entire wireless communications apparatus, execute a software program, and process data of the software program. For example, the processor 901 is configured to support the wireless communications apparatus in performing the actions described in the foregoing method embodiments. The memory 902 is mainly configured to store the software program and the data. The transceiver 903 is mainly configured to: perform conversion between a baseband signal and a radio frequency signal, and process the radio frequency signal. The antenna 904 is mainly configured to send and receive a radio frequency signal in a form of an electromagnetic wave. The input/output apparatus 905, for example, a touchscreen, a display, or a keyboard, is mainly configured to receive data entered by a user and output data to the user.

When the terminal side device 900 performs an action of the terminal side device in the procedure shown in FIG. 2:

the processor 901 is configured to: determine a frequency domain resource of a scheduled first physical downlink shared channel PDSCH, where the first PDSCH corresponds to a first demodulation reference signal DM-RS on a first antenna port; and when the frequency domain resource includes N consecutive frequency domain units, and there is a second DM-RS on a second antenna port in each of L consecutive frequency domain units in the N frequency domain units, determine that precoding of the second DM-RS in each of the L frequency domain units is the same.

The second DM-RS and the first DM-RS are in a same code division multiplexing CDM group, the second DM-RS corresponds to a second PDSCH scheduled for a second terminal side device, N is an integer greater than 1, and L is less than or equal to N, and is an integer greater than 1.

For another step performed by the terminal side device 900, refer to the descriptions in step 201 to step 204. Details are not described herein again.

Figure 10:
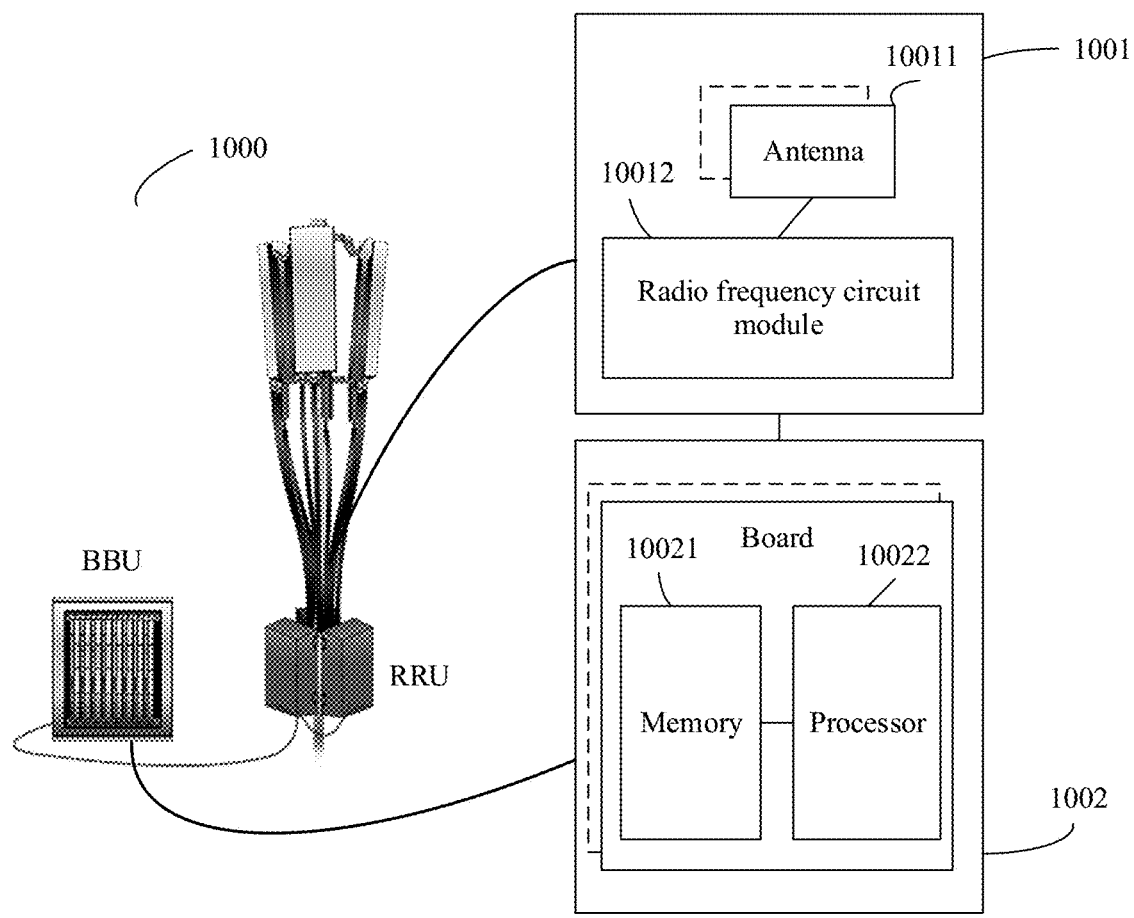
FIG. 10 is a schematic structural diagram of a network side device according to an embodiment of this application.

FIG. 10 is a schematic structural diagram of a network side device. The network side device may be configured to perform the actions of the network side device in the foregoing method embodiments. The network side device 1000 includes one or more remote radio frequency circuit modules e.g. remote radio unit (RRU) 1001 and one or more baseband units (BBU) 1002. The RRU 1001 may be referred to as a transceiver unit, a transceiver, a transceiver circuit, a transceiver machine, or the like, and may include at least one antenna 10011 and a radio frequency circuit module 10012. The RRU 1001 is mainly configured to: send and receive a radio frequency signal, and perform conversion between the radio frequency signal and a baseband signal, for example, configured to send the signaling indication or the reference signal in the foregoing embodiments to a terminal. The BBU 1002 is mainly configured to: perform baseband processing, control the network side device, and the like. The RRU 1001 and the BBU 1002 may be physically disposed together, or may be physically separated, that is, in a distributed base station.

The BBU 1002 is a control center of the network side device, may be referred to as a processing unit, and is mainly configured to complete baseband processing functions such as channel coding, multiplexing, modulation, and spectrum spreading. In an example, the BBU 1002 may include one or more boards, and a plurality of boards may jointly support a radio access network (for example, a 5G network) of a single access standard, or may separately support radio access networks of different access standards. The BBU 1002 further includes a memory 10021 and a processor 10022. The memory 10021 is configured to store a necessary instruction and necessary data. The processor 10022 is configured to control the network side device to perform a necessary action. The memory 10021 and the processor 10022 may serve one or more boards. In other words, a memory and a processor may be disposed on each board. Alternatively, a plurality of boards may share a same memory and processor. In addition, a necessary circuit is further disposed on each board.

When the network side device 1000 performs an action of the network side device in the procedure shown in FIG. 2:

the processor 10022 is configured to determine a frequency domain resource of a first physical downlink shared channel PDSCH scheduled for a first terminal side device, where the first PDSCH corresponds to a first demodulation reference signal DM-RS on a first antenna port; and the radio frequency circuit module 10012 is configured to: when the frequency domain resource includes N consecutive frequency domain units, send the first DM-RS in each of L consecutive frequency domain units in the N frequency domain units, and send a second DM-RS on a second antenna port in each of the L frequency domain units, where precoding of the second DM-RS sent in each of the L frequency domain units is the same.

The second DM-RS and the first DM-RS are in a same code division multiplexing CDM group, the second DM-RS corresponds to a second PDSCH scheduled for a second terminal side device, N is an integer greater than 1, and L is less than or equal to N, and is an integer greater than 1.

For another step performed by the network side device 1000, refer to the descriptions in step 201 to step 204. Details are not described herein again.

It is clear that, a person skilled in the art can make various modifications and variations to this application without departing from the scope of this application. This application is intended to cover these modifications and variations of this application provided that they fall within the scope of protection defined by the following claims and their equivalent technologies.

What is claimed is:

1. A communications method comprising:
   determining, by a first terminal side device, a frequency domain resource of a scheduled first physical downlink shared channel (PDSCH),
      wherein the frequency domain resource comprises N consecutive frequency domain units,
      wherein a first demodulation reference signal (DM-RS) is transmitted for the first PDSCH on a first antenna port of the first terminal side device and in each of L consecutive frequency domain units in the N consecutive frequency domain units, and
      wherein there is a second DM-RS of a second terminal side device on a second antenna port of the second terminal side device in each of the L consecutive frequency domain units in the N frequency domain units; and
   determining, by the first terminal side device, that precoding of the second DM-RS of the second terminal side device is the same as the precoding of the first DM-RS based on the transmission of the second DM-RS also being in each of the L frequency domain units,
      wherein the second DM-RS and the first DM-RS are in a same code division multiplexing (CDM) group,
      wherein the second DM-RS is transmitted for a second PDSCH scheduled for the second terminal side device, and
      wherein N is an integer greater than 1, L is less than or equal to N, and is an integer greater than 1.

2. The method according to claim 1, wherein N is determined based on a granularity of a precoding resource block group (PRG) of the first terminal side device.

3. The method according to claim 2, wherein the granularity of the PRG of the first terminal side device is two frequency domain units and N is 2: or
   the granularity of the PRG of the first terminal side device is four frequency domain units or a bandwidth of the first PDSCH and N is 2: or
   the granularity of the PRG of the first terminal side device is four frequency domain units or a bandwidth of the first PDSCH and N is 4.

4. The method according to claim 3, wherein N=2 and N is equal to L: or when N and L is 2, 3, or 4.

5. The method according to claim 1, further comprising:
performing, by the first terminal side device, joint channel estimation for the first terminal side device based on the precoding of the second DM-RS in the L frequency domain units.

6. A communications method for transmitting demodulation reference signals on a frequency domain resource comprising N consecutive frequency domain units, the method comprising:
sending, by a network side device, a first demodulation reference signal (DM-RS) of a first terminal device on a first antenna port in each of L consecutive frequency domain units of the N frequency domain units,
wherein N is an integer greater than 1, L is less than or equal to N, and is an integer greater than 1,
wherein the first DM-RS is in a first code division multiplexing (CDM) group, and
wherein the first DM-RS is transmitted for a first physical downlink shared channel (PDSCH); and
sending, by the network side device, a second DM-RS of a second terminal side device on a second antenna port in each of the L frequency domain units, thereby informing the first terminal side device that precoding of the second DM-RS is the same as the precoding of the first DM-RS,
wherein the second DM-RS is also in the first CDM group, and
wherein the second DM-RS is transmitted for a second PDSCH scheduled for the second terminal side device.

7. The method according to claim 6, wherein N is determined based on a granularity of a precoding resource block group (PRG) of the first terminal side device.

8. The method according to claim 7, wherein the granularity of the PRG of the first terminal side device is two frequency domain units and N is 2: or
the granularity of the PRG of the first terminal side device is four frequency domain units or a bandwidth of the first PDSCH and N is 2; or
the granularity of the PRG of the first terminal side device is four frequency domain units or a bandwidth of the first PDSCH and N is 4.

9. The method according to claim 7, wherein N=2 and N is equal to L; or N=4 and L is 2, 3, or 4.

10. The method according to claim 6, wherein the first terminal side device performs joint channel estimation for the first terminal side device based on the precoding of the second DM-RS in the L frequency domain units.

11. A first terminal side device comprising a memory storing instructions and at least one processor coupled with the memory, wherein the instructions when executed by the at least one processor cause the first terminal side device to:
determine a frequency domain resource of a scheduled first physical downlink shared channel (PDSCH),
wherein the frequency domain resource comprises N consecutive frequency domain units,
wherein a first demodulation reference signal (DM-RS) is transmitted for the first PDSCH on a first antenna port of the first terminal side device and in each of L consecutive frequency domain units in the N consecutive frequency domain units,
wherein there is a second DM-RS on a second antenna port of the second terminal side device in each of the L consecutive frequency domain units in the N frequency domain units; and
determine that precoding of the second DM-RS in each of the L frequency domain units is the same as the precoding of the first DM-RS based on the transmission of the second DM-RS also being in each of the L frequency domain units,
wherein the second DM-RS and the first DM-RS are in a same code division multiplexing (CDM) group,
wherein the second DM-RS is transmitted on a second PDSCH scheduled for the second terminal side device, and
wherein N is an integer greater than 1, L is less than or equal to N, and is an integer greater than 1.

12. The first terminal side device according to claim 11, wherein N is determined based on a granularity of a precoding resource block group (PRG) of the first terminal side device.

13. The first communications apparatus terminal side device according to claim 12, wherein the granularity of the PRG of the first terminal side device is two frequency domain units and N is 2: or
the granularity of the PRG of the first communications apparatus is four frequency domain units or a bandwidth of the first PDSCH and N is 2: or
the granularity of the PRG of the first communications apparatus is four frequency domain units or a bandwidth of the first PDSCH and N is 4.

14. The first terminal side device according to claim 12, wherein N=2 and N is equal to L: or N=4 and L is 2, 3, or 4.

15. The first terminal side device according to claim 11, wherein the instructions when executed by the at least one processor cause the apparatus to further:
perform joint channel estimation for the first terminal side device based on the precoding of the second DM-RS in the L frequency domain units.

16. A network side device comprising a memory storing instructions and at least one processor coupled with the memory, wherein the instructions when executed by the at least one processor cause the network side device to:
send on a first antenna port a first demodulation reference signal (DM-RS) of a first terminal side device on a first antenna port in each of L consecutive frequency domain units of a frequency domain resource comprising N consecutive frequency domain units,
wherein N is an integer greater than 1, L is less than or equal to N, and is an integer greater than 1,
wherein the first DM-RS is in a first code division multiplexing (CDM) group, and
wherein the first DM-RS is transmitted for a first physical downlink shared channel (PDSCH); and
send a second DM-RS of a second terminal side device on a second antenna port in each of the L frequency domain units, thereby informing the first terminal side device that precoding of the second DM-RS is the same as the precoding of the first DM-RS,
wherein the second DM-RS is also in the first CDM group, and
wherein the second DM-RS is transmitted for a second PDSCH scheduled for the second terminal side device.

17. The network side device according to claim 16, wherein N is determined based on a granularity of a precoding resource block group (PRG) of the first terminal side device.

18. The network side device according to claim 17, wherein the granularity of the PRG of the first terminal side device is two frequency domain units and N is 2: or the granularity of the PRG of the first terminal side device is four frequency domain units or a bandwidth of the first PDSCH and N is 2: or the granularity of the PRG of the first terminal side device is four frequency domain units or a bandwidth of the first PDSCH and N is 4.

19. The network side device according to claim 17, wherein N=2 and N is equal to L; or N=4 and L is 2, 3, or 4.

20. The network side device according to claim 16, wherein the first terminal side device performs joint channel estimation for the first terminal side device based on the precoding of the second DM-RS in the L frequency domain units.

* * * * *

UNITED STATES PATENT AND TRADEMARK OFFICE
CERTIFICATE OF CORRECTION

PATENT NO. : 12,137,450 B2
APPLICATION NO. : 17/095542
DATED : November 5, 2024
INVENTOR(S) : Hua et al.

It is certified that error appears in the above-identified patent and that said Letters Patent is hereby corrected as shown below:

In the Claims

Claim 3: Column 18, Line 59: "frequency domain units and N is 2: or" should read as
-- frequency domain units and N is 2; or --.

Claim 3: Column 18, Line 62: "first PDSCH and N is 2: or" should read as -- first PDSCH and N is 2; or --.

Claim 4: Column 18, Line 67: "is equal to L: or when N and L is 2, 3, or 4." should read as
-- is equal to L; or when N and L is 2, 3, or 4. --.

Claim 8: Column 19, Line 36: "frequency domain units and N is 2: or" should read as
-- frequency domain units and N is 2; or --.

Claim 9: Column 19, Line 43: "The method according to claim 7, wherein N=2 and Nis"
should read as -- The method according to claim 7, wherein N=2 and N is --.

Claim 11: Column 19, Line 61: "secutive frequency domain units," should read as
-- secutive frequency domain units, and --.

Claim 13: Column 20, Line 15: "The first communications apparatus terminal side" should
read as -- The first terminal side --.

Claim 13: Column 20, Line 18: "domain units and N is 2: or" should read as -- domain units and N is 2; or --.

Claim 13: Column 20, Line 21: "width of the first PDSCH and N is 2: or" should read as
-- bandwidth of the first PDSCH and N is 2; or --.

Signed and Sealed this
Third Day of June, 2025

Coke Morgan Stewart
*Acting Director of the United States Patent and Trademark Office*

Claim 14: Column 20, Line 26: "wherein N=2 and N is equal to L: or N=4 and L is 2, 3, or" should read as -- wherein N=2 and N is equal to L; or N=4 and L is 2, 3, or --.

Claim 18: Column 20, Line 67: "device is two frequency domain units and N is 2: or" should read as -- device is two frequency domain units and N is 2; or --.

Claim 18: Column 21, Line 3: "first PDSCH and N is 2: or" should read as -- first PDSCH and N is 2; or --.